Patented Apr. 19, 1932

1,854,801

UNITED STATES PATENT OFFICE

HENRY N. LYONS, OF OKMULGEE, OKLAHOMA, ASSIGNOR TO DOHERTY RESEARCH COMPANY, OF NEW YORK, N. Y., A CORPORATION OF DELAWARE

PROCESS OF PURIFYING LIQUIDS

No Drawing.  Application filed March 20, 1924. Serial No. 700,735.

The present invention relates to the separation of a liquid substance from a contaminating liquid impurity dissolved therein. It is a common experience in the chemical manufacturing industries to find a desired liquid product contaminated by a dissolved liquid impurity of such character that the desired product has relatively small commercial value until the impurity has been removed.

Illustrations of such products having dissolved impurities therein are the higher alcohols manufactured from the waste gases of the petroleum industry. In the manufacture of the higher alcohols, those containing three or more carbon atoms from the waste gases of petroleum cracking and distillation, it has been found that the alcohols are contaminated by a small amount of bad smelling substance, or substances, which render them unfit for the most valuable uses to which the alcohols are adapted. It has been proposed—as in patent to Mann No. 1,413,864—to purify or refine such alcohols by diluting the crude alcohols made from petroleum gases with water and to a dilution of 20% alcohol and then to filter through sawdust. The filtered liquid was then rectified to obtain alcohol of commercial strength. By this method the original contaminating impurities are removed by filtration. This method, however, may introduce resins and tannins from the sawdust into the alcohol or alcohols being treated which may be undesirable in some grades of alcohol.

It is accordingly one of the objects of the present invention to devise a method or process whereby liquid impurities dissolved in a body of commercially valuable liquid may be removed from such valuable liquid in a rapid, thorough and economical manner.

A second object of the invention is to provide an improved method or process for the refining or purification of alcohols derived from petroleum gases.

A further object of the invention is to avoid introducing new foreign liquid into a liquid product in the process of refining or purifying it.

Further objects and advantages of the present invention will be apparent to those skilled in the chemical and allied arts from the following description.

It is known that the bad smelling impurities which must be removed from higher alcohols made from petroleum gases, such as isopropyl alcohol, in order to obtain the best prices for the alcohols, are water-insoluble, whereas, of course, the alcohols having not more than four carbon atoms are water soluble. It is known also that as water is added to the crude or impure alcohol, a point is reached at which the alcohol is too dilute to retain the impurities in solution. This point is commonly indicated by a cloudiness in the solution. The percentage of impurities is not enough to form a separate layer if the process of manufacture has been conducted carefully, but it is nevertheless very important that the impurities be removed. I have discovered that when the impurities have been thus thrown out of solution by diluting the alcohol with water, that pure alcohol, suitable for use in perfumery, may be recovered from the dilute mixture by simple rectification. This surprising result flows from the facts, also observed by me, that the impurities lighter than the alcohol being purified distil off from the dilute solution before much of the alcohol comes over, whereas the impurities heavier than the alcohol being purified come over after the main body of the alcohol has been distilled, there being a definite cut of substantially pure good smelling alcohol, so that the simple rectification yields a pure product.

A specific example of the application of the present invention to the purification or refining of a crude or impure commercial liquid is as follows: Crude isopropyl alcohol or secondary butyl alcohol made from petroleum gases is diluted with water to the point at which the water insoluble impurities dissolved in the alcohol are thrown out of solution as indicated by a cloudiness in the solution. This occurs usually when the solution contains about 20% alcohol by volume. It is then necessary according to the present invention merely to rectify the dilute solution, no filtering being necessary. Upon distilling the cloudy dilute alcohol solution, the impurities, together with some alcohol, come over at the beginning after which the pure alcohol will follow.

In addition to its use in purifying the higher alcohols now made by petroleum gases, the present invention is adapted to the purification of ethyl alcohol by removing water insoluble substances therefrom. As an illustration of the efficiency of the process, alcohol supposedly completely denatured according to an approved formula may be completely renatured by proceeding according to the present invention.

Moreover acetone made from crude isopropyl alcohol contains much the same impurities as the alcohol and is refined or purified according to the present invention in the manner just described for the purification of isopropyl alcohol.

The present invention, however, is not limited to the elimination of water insoluble impurities but may be extended to include any system in which the impurity is caused to exert its normal vapor pressure while the vapor pressure of the liquid to be purified is depressed by solution in a second liquid which is not a solvent for the impurity and may be subsequently removed from the first liquid by diluting with water and distilling, for intance, if a water soluble liquid that is soluble in benzol contains an impurity that is insoluble in benzol, to purify the liquid according to the present invention, the crude liquid is first diluted with benzol, the impurity or impurities removed by rectification and the benzol is subsequently removed by diluting with water and rectification.

It is to be understood that in the appended claims the word "immediately" is used not in the sense that two steps of the process are to follow each other without lapse of time but only in the sense that one step is to follow another without an intervening or intermediate step.

Having thus described my invention, I claim:

1. The process of separating water soluble alcohol obtained from petroleum hydrocarbons from water insoluble polymer hydrocarbon liquid impurities dissolved therein, comprising diluting the alcohol to be purified with sufficient water to throw the hydrocarbon impurities out of solution in the alcohol, distilling from the diluted liquid mixture, first the lighter impurities, then a substantially pure alcohol cut and collecting the alcohol cut separate from the impurities.

2. The process of separating isopropyl alcohol manufactured from hydrocarbon material from water-insoluble liquid impurities comprising diluting the isopropyl alcohol to be purified with sufficient water to throw the impurities out of solution, and immediately separating the impurities from the diluted alcohol by distilling therefrom, first the lighter impurities, then a substantially pure cut of isopropyl alcohol.

3. The process of separating water soluble alcohols manufactured from petroleum products from small quantities of water insoluble impurities dissolved therein which distill in the presence of water at a lower temperature than the alcohol to be treated, which comprises diluting the alcohol to be purified with sufficient water to create a cloudiness in the alcohol due to throwing the impurities out of the solution, thereafter separating the impurities from the diluted alcohol by distilling therefrom first the impurities and then a substantially pure alcohol cut and separately collecting the alcohol from the impurities.

4. The process of separating isopropyl alcohol manufactured from hydrocarbon material from small quantities of water-insoluble polymer-like impurities dissolved therein comprising diluting the isopropyl alcohol to be purified with sufficient water to create a cloudiness in the alcohol due to throwing the impurities out of solution and immediately separating the impurities from the diluted isopropyl alcohol by rectification.

5. The process of purifying water soluble liquids from a vaporizable impurity which in the presence of a water insoluble liquid has a higher relative volatility than the liquid to be purified, which comprises mixing the liquid to be purified containing said impurities with a water insoluble liquid which in turn is a solvent for the liquid to be purified, but not for said impurity, subjecting the resulting mixture to distillation whereby said impurity is removed, diluting the remaining liquid mixture with water to thereby throw said water insoluble liquid out of solution in the remaining mixture, and thereafter subjecting the diluted mixture to rectification to separate said remaining liquids.

6. The process of purifying isopropyl alcohol and other water soluble alcohols manufactured from petroleum products and containing difficultly removable impurities insoluble in water, but which distill in the presence of water at a lower temperature than the alcohol to be purified, which comprises diluting the alcohol with water, distilling the resulting mixture to drive off said impurities, and thereafter distilling over a substantially pure alcohol cut.

7. The process defined in claim 6 in which the alcohol to be purified is diluted to the extent that it comprises about 20 per cent by volume of the mixture.

In testimony whereof I affix my signature.

HENRY N. LYONS.